(No Model.)
J. ZENK.
PHOTOGRAPHIC CAMERA.
No. 492,703. Patented Feb. 28, 1893.
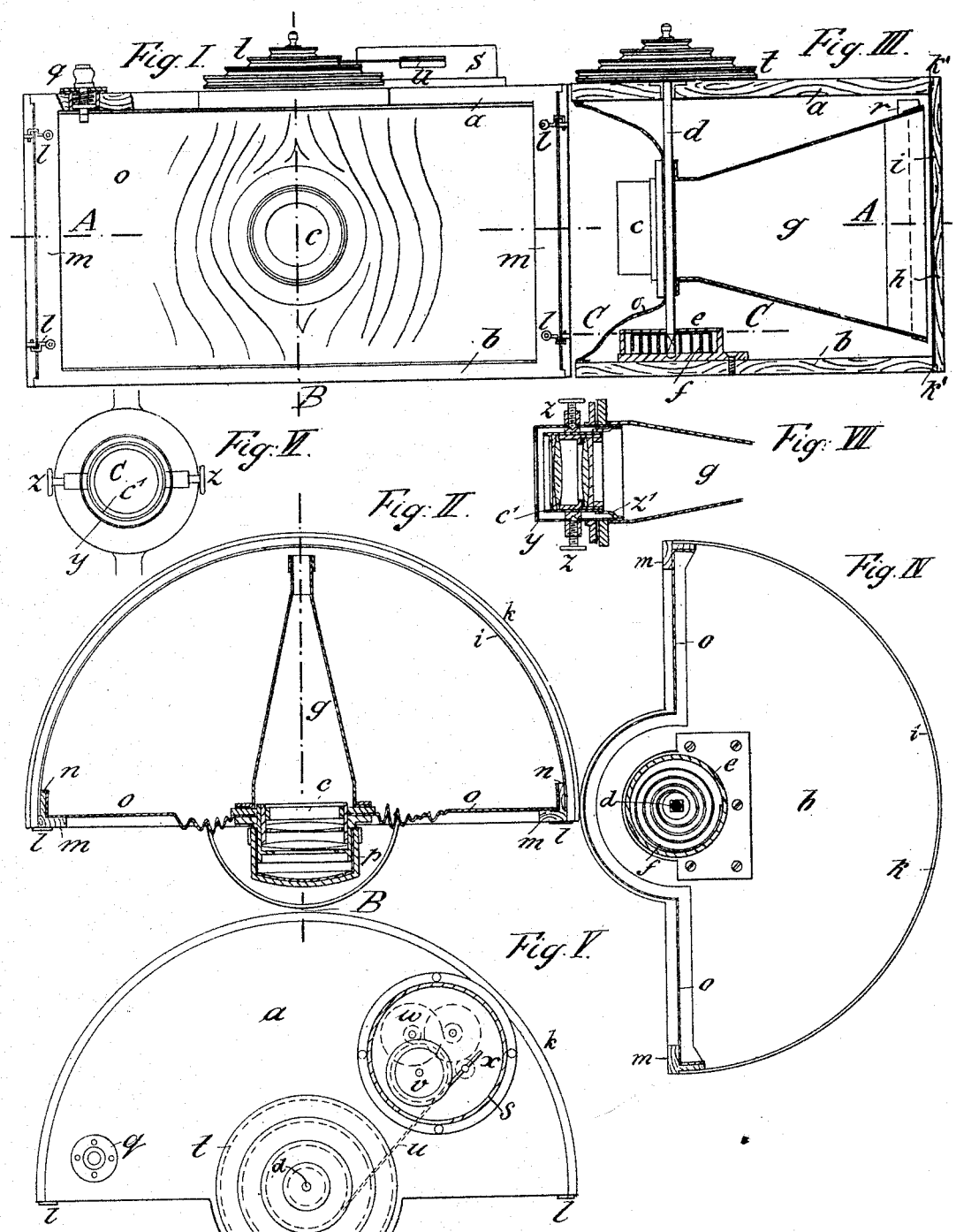
Witnesses:
J. A. Rutherford
Robert Everett
Inventor:
Josef Zenk
James L. Norris
Attorney.

UNITED STATES PATENT OFFICE.

JOSEF ZENK, OF SCHLÜSSELFELD, GERMANY.

PHOTOGRAPHIC CAMERA.

SPECIFICATION forming part of Letters Patent No. 492,703, dated February 28, 1893.

Application filed February 6, 1892. Serial No. 420,519. (No model.)

*To all whom it may concern:*

Be it known that I, JOSEF ZENK, photographer, a subject of the Emperor of Germany, residing at Schlüsselfeld, in the Kingdom of Bavaria and German Empire, have invented new and useful Improvements in Photographic Cameras, of which the following is a specification.

This invention relates to photographic cameras of the kind in which the objective during exposure performs a rotary movement. According to this invention the camera is provided with a braking device which retards the rotary movement of the vertical axis of the objective to the extent requisite for taking a good picture; and grooved pulleys of varying dimensions are employed upon which the cord or chain actuating the braking device is wound by the action of a spiral spring whereby the braking or retarding action can be made variable; furthermore pillars at the ends of the semi-circularly-formed camera are employed by which is effected an automatic closure of the slit in the funnel mounted on the objective.

A camera according to this invention is illustrated in the accompanying drawings.

Figure I is a front elevation with the objective set in the center of the apparatus. Fig. II is a horizontal section on the line A A Figs. I and III. Fig. III is a vertical section on the line B B. Figs. I and II. Fig. IV is a horizontal section on the line C C. Fig. III. Fig. V is a plan partly in horizontal section. Figs. VI and VII are respectively a front elevation and a horizontal section showing an arrangement on the objective for enabling the optical axis to be adjusted in a vertical direction.

$a$ and $b$ are upper and lower plates between which is arranged the objective $c$. which is capable of rotating about a vertical shaft $d$, movement being imparted to it by a spiral spring $f$ inclosed in a casing $e$, said spiral spring $f$ enabling the optical axis and consequently the objective to rotate from right to left. The objective $c$ is provided at the rear with a funnel $g$ which increases in size in a vertical sense, and becomes narrower in a horizontal sense, so that the rays of light falling through the objective $c$ are thrown by the funnel to the rear where they pass through the opening at that end of the funnel. The rear surface of the camera is of semi-circular form and is made for this purpose of a circular casing $k$ in front of which the sensitive plate $i$ is inserted and clamped in place. The plate is preferably in the form of a film, but it may consist of any other suitable pliable material which will adapt itself to the shape of the casing. For the purpose of fastening the film, the casing is stepped at top and bottom at $k'$ $k'$ and is held both sides of the camera by means of hooks $l$ $l$ and eyes. The objective with the aid of the funnel $g$ throws the rays of light upon a circular surface which is everywhere located at an equal distance from the center of the apparatus. The hooks $l$ are pivoted to the end pillars $m$. $m$. which keep the cover $a$ and the bottom $b$ of the camera at a suitable distance apart, and also serve to cover the slit of the funnel $g$ in the end positions of the latter. For this purpose the pillars $m$ are provided with rearwardly directed flanges $n$ and are covered on their inner sides with cloth $o$. The cloth $o$ is carried in folds up to the objective and is there fastened in such a manner that the front portion of the camera is closed by it. The cloth $o$ is also fastened at top and bottom to the cover $a$ and the bottom $b$.

$p$ is a hood which serves to cover the objective before exposure, as well understood.

The spring $f$ is placed in tension so that it is capable of rotating the objective with some force from its right hand position into the left hand position, and thus move the funnel $g$ out of its extreme left hand position quickly along the surface of the film toward the right.

The funnel $g$ and with it the objective, is held in the initial position by a pawl or catch device $q$ the beveled end of which catches against the sheet metal pieces $r$ and firmly holds the latter. When the catch $q$ is disengaged, the funnel and with it the objective moves quickly to the other terminal position.

For the purpose of regulating the speed of the rotary movement of the objective there is provided a braking device $s$ which is connected in the following manner with the axis $d$ of the objective. On this axis $d$ is mounted a number of grooved pulleys $t$ of varying diameters, which are connected by means of a cord or chain $u$ with the driving drum $v$ of the braking device $s$. When the shaft $d$ rotates, the fly $x$ is caused by toothed gearing $w\ w$ to rotate, and exert a retarding influence on the axis $d$. According as a larger or smaller grooved pulley $t$ is connected with the rope or chain $u$ the speed of rotation of the axis $d$ can be varied.

For the purpose of enabling the optical axis of the objective to be adjusted vertically, the objective is inclosed in a tube $y$ and is pivoted by means of screws $z$ in such a manner that by turning the latter the inclination of the objective can to some extent be varied. The space or aperture between the objective tube $c$ and the outer tube $y$ is closed by a folding cloth $z'$. This photographic camera has the advantages of very great simplicity and ease of manipulation. It has no complicated mechanism for rotating the axis of the objective in a horizontal direction, and can be constructed of all sizes.

Furthermore by the employment of the braking device the apparatus can be used for instantaneous exposures, as also for time-exposures. It closes or shuts off the objective securely in its end positions, and thus prevents the light from acting upon the edges of the film.

The vertical adjustment of the axis of the objective by the use of the most simple means enables the picture to be shifted vertically and thus distant and near objects to be taken simultaneously.

Having fully described my invention, what I desire to claim and secure by Letters Patent is—

1. In a photographic camera, the combination with a casing, a shaft adapted to rotate therein, and an objective adapted to rotate with said shaft, of a braking device, a series of grooved pulleys of varying diameters mounted on the rotating shaft, and a cord or chain connecting said braking device with the series of grooved pulleys, substantially as described.

2. In a photographic camera, the combination of a rotary shaft, an objective adapted to rotate with said shaft, a funnel extending rearward from said objective and increasing in height and decreasing in width from front to rear, the pillars $m$ provided with inwardly extended flanges $n$ to automatically close the end of said funnel in its extreme positions and the cloth $o$ secured to said pillars and flanges, substantially as described.

In testimony whereof I have hereunto set my hand and affixed my seal in presence of two subscribing witnesses.

JOS. ZENK. [L. S.]

Witnesses:
AND. LUŸ,
KLEIN BEGNISSER.